Patented June 20, 1950

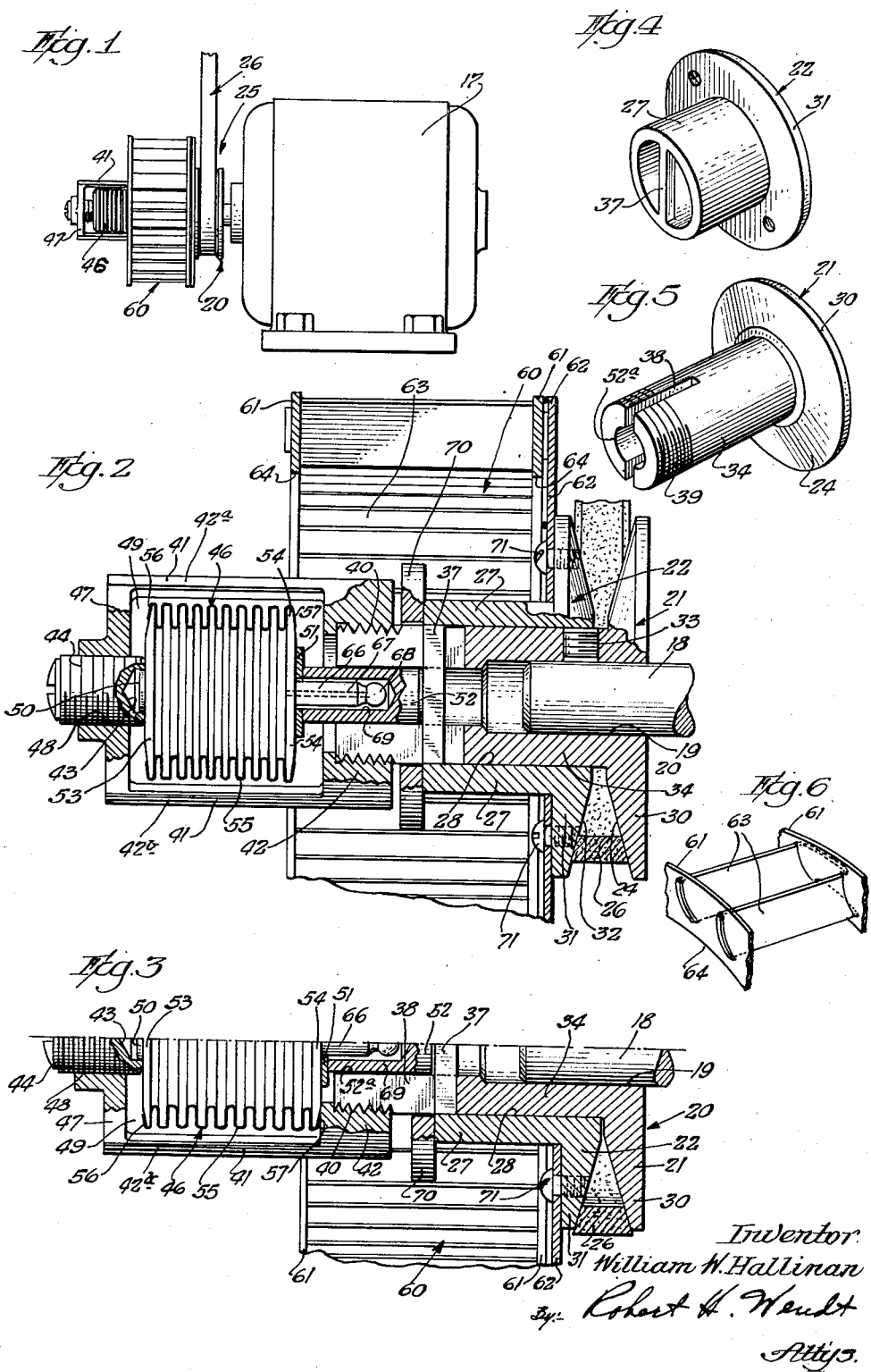

2,512,425

UNITED STATES PATENT OFFICE 2,512,425

APPARATUS FOR HOT-AIR HEATING SYSTEMS

William W. Hallinan, Racine, Wis.

Application October 29, 1945, Serial No. 625,296

2 Claims. (Cl. 74—230.17)

The present invention relates to a change speed device which is particularly adapted to be used in connection with a hot air heating system. Where hot air heating systems are used in residences and a blower is utilized in connection with the system, and is operated intermittently, the control for the motor is usually located in one of the rooms; and hence the temperature of the air in the other rooms is not directly reflected in the control or operation of the blower.

One of the objects of the present invention is the provision of an improved device which will permit the use of a constant speed motor, but which will cause a variation in the speed of rotation of the blower, depending upon the variations in the temperature of air impressed upon the present device.

Another object of the invention is the provision of an improved device of the class described which is adapted to be attached as a unit to existing structures, such as a driving motor provided with a belt driven blower, used in connection with the operation of a hot air heating system, so that the system can be changed over without extensive modifications in the structure of the system.

Another object of the invention is the provision of an improved change speed device of the class described which may be interposed between the blower and its driving motor, and which is operated by a thermally responsive device that is interposed in the path of a current of air surrounding the device, so that the present change speed device is operated responsive to the temperature of the air passing over it.

Another object of the invention is the provision of an improved temperature responsive variable speed pulley which is an improvement over the variable speed pulleys covered by my prior Patents Nos. 2,210,976, filed March 15, 1938, issued August 13, 1940, on Variable Speed Pulleys, and 2,308,655, filed January 13, 1940, issued January 19, 1943, on Variable Speed Pulleys.

As stated in my above Patent No. 2,308,655, page 6, column 2, lines 44 to 48, my thermostatically controlled pulley is adapted to be used either as the driving or the driven member, and its thermostatic element may be so arranged that it increases the diameter or decreases the diameter upon increase of temperature.

As the motors which drive the blowers in heating systems usually operate at a greater speed than the blowers, and thus the motors usually are provided with a smaller pulley, while the blower has a larger pulley, I prefer to use my variable speed pulley as the driving member, as it is thus adapted to exert a wider control of the speed.

When the variable speed pulley is used as the driving member, it may be made more compact and simple in construction; and when its pulley is so made that it increases in diameter with increase in temperature, the variable speed pulley may be made to increase the delivery of air driven by the blower with an increase in temperature, thus avoiding the cold drafts that would result if the blower were driven faster when the air was colder.

One of the objects of the present invention is the provision of an improved thermostatically controlled variable speed pulley which is adapted to be installed as a unit, and which is provided with a means for maintaining the circulation of air around the thermal unit at all times, to assure the immediate responsiveness of the device to the air in the duct within which it is placed.

Another object of the invention is to provide an improved thermally responsive change speed device which will react to small variations in the temperature with a high degree of accuracy, and this is preferably accomplished by mounting the temperature responsive device directly on a rotary part of a change speed unit in the path of a moving current of air flowing in the conduit in which the device is located.

Other objects and advantages of the invention will be apparent from the folowing description and the accompanying drawings, in which similar characters of reference indicate similar parts throughout the several views.

Referring to the single sheet of drawings,

Fig. 1 is a view in perspective of the driving motor for the blower of a heating system equipped with a variable speed pulley embodying my invention;

Fig. 2 is a fragmentary transverse sectional view, taken on a plane passing through the axis of the motor, with certain of the parts shown in elevation, and with the variable speed pulley in a position of relatively small diameter;

Fig. 3 is a fragmentary sectional view similar to Fig. 2, showing the variable speed pulley in a position of maximum diameter;

Fig. 4 is a view in perspective of the relatively movable section of the variable speed pulley;

Fig. 5 is a view in perspective of the relatively fixed section of the variable speed pulley; and Fig. 6 is a fragmentary sectional view showing the attachment of the centrifugal blades to the rotor.

The present variable speed pulley may be utilized in any of the heating systems illustrated in any of my prior patents, and in particular reference is made to the heating system shown in Fig. 1 of my Patent No. 2,308,655 and the heating system shown in Fig. 5 of my Patent No. 2,210,976. In the former, the pulley and blower are located in one of the cold air return ducts of the furnace, but the pulley is operated responsive to the temperature of air which is delivered to the thermostatic element of the pulley by a conduit from the top of the plenum chamber of the furnace.

In either case the present device is provided with a substantially constant speed motor 17, which is adapted to drive the blower of the heating system. The change speed device is indicated in its entirety by the numeral 25, and it is engaged by a suitable driving belt 26 of the V type, which connects the driving pulley 20 with the driven pulley (not shown) on the blower.

In order to take up or permit the increase or decrease in slack of the belt 26, the motor may be mounted pivotally, as shown in my prior patent, No. 2,308,655, so that movement of the motor takes up the slack, or the driven pulley may include a pair of spring pressed discs of the type shown in Fig. 3 of my Patent No. 2,289,287, issued July 7, 1942, on heating systems, filed October 16, 1939.

The change speed device 25 is controlled by a thermal unit hereinafter to be described, which varies the speed of the blower in accordance with the change in temperature of the air to which the thermal unit is subjected. While the arrangement may be either for the speed of the blower to be increased by increase of temperature or by decrease of temperature of the air by merely changing the direction of movement of the sliding pulley sections, as described in my prior patent, No. 2,308,655 (page 6, column 2, lines 43 to 48, inclusive). I prefer to arrange the parts so that an increase of temperature of the air on the thermostatic unit increases the effective diameter of the pulley and the speed of rotation of the blower.

Thus the device is provided with a thermostat, indicated by the numeral 46, which is controlled by the temperature of the air to which it is subjected, to vary the effective diameter of the change speed pulley 20.

The driving shaft of the motor is indicated by the numeral 18, and it is adapted to receive a pair of pulley sections, indicated by the numerals 21 and 22. The pulley section 21 comprises a substantially cylindrical hub 34, which is provided with a radially extending pulley flange 30, having a frusto-conical surface 24.

The pulley section 21 comprises a relatively fixed section of the pulley, and it is provided with a bore 19 for receiving the shaft 18, to which it is secured by any suitable fastening means, such as a set screw 33, preferably of the socket type, threaded in a bore in the hub 34.

The movable pulley section 22 is likewise provided with a substantially cylindrical hub 27, having a cylindrical bore 28 for slidably receiving the external cylindrical surface on the hub 34 of the fixed section 21.

The hub 27 of the movable pulley section 22 is also provided with a radially extending pulley flange 31, having a beveled surface 32 located oppositely to the surface 24 to form a V-shaped groove or slot for driving the driving belt 26.

Thus the pulley flange 31 is mounted for axial movement relative to the pulley flange 30.

Referring to Fig. 5, this shows in perspective the construction of the fixed pulley section 21, with its flange 30 and frusto-conical surface 24 carried by hub 34. The hub 34 is purposely elongated over the length of the hub 27, shown in Fig. 4, on the movable pulley section 22, with its pulley flange 31, the frusto-conical surface 32 of which is on the side not shown.

The purpose for making the hub 34 longer than the hub 27 is in order to permit the movable section 22 a sufficient range of sliding movement on the fixed section 21. The movable section 22 is preferably splined with respect to the fixed section 21 to prevent relative rotation between these two parts of the pulley, and this may be accomplished by providing the hub 27 with a diametrically extending transverse bar 37 located on its left face in Fig. 4 and adapted to be received in a slot 38, which extends axially and diametrically across the hub 34 over a portion of its length.

The bar 37 is preferably rectangular in cross section and is complementary in shape to that of the slot 38, within which it slides when the hub 27 is on the hub 34. In addition to preventing relative rotation between the pulley sections 21 and 22, the transverse splined bar 37 also serves to provide engagement between the movable pulley section and a stub shaft or other part which is actuated by the thermostat 46.

The section 21 of the pulley preferably has its hub 34 provided with a threaded portion 39, which is adapted to be engaged in the threaded bore 40 of a skirt portion 42 of a frame 41 for supporting the thermostat 46.

It is necessary that the thermostat 46 be supported upon one of the pulley elements 21 or 22 in order that it may react against the other of the pulley elements 21 or 22; and in some embodiments of the invention the movable pulley section 22 may have its hub 27 threaded to receive the skirt 42 of the frame 41, in which case the thermostat 46 would react against the fixed pulley section 21 at the end of its hub 34.

The frame 41 in the present embodiment is preferably provided with a pair of legs 42a, 42b, which extend axially and parallel to each other and which are joined by the diametrically and transversely extending yoke 47, which has a centrally located threaded bore 48.

Between the skirt 42, yoke 47 and legs 42a and 42b, there is a substantially rectangular opening 49, which is adapted to receive the thermostatic element 46. The bore 48 of yoke 47 is preferably provided with a threaded screw bolt 44 having a slot for engagement with a screw driver and having at its inner end a socket 43 for receiving a centrally located lug 50, which is carried by the end of the thermostatic element 46.

The thermostatic element reacts against the threaded member 44, and the position of the parts may be adjusted by screwing the screw bolt 44 in or out to increase the initial pressure on the thermostatic element 46.

The thermostatic element 46 preferably comprises a pair of end plates 53, 54, each of which is substantially circular and is provided with a tapering edge for receiving the resilient and flexible bellows 55. The bellows 55 comprises a corrugated, substantially cyindrical, resilient and flexible metal member, which is expansible in an axial direction upon exertion of pressure inside the thermostatic element 46, and the bellows 55 has a fluid-tight connection with the plates 53 and 54 by having the endmost flanges 56 and 57 folded over the edges of the discs 53 and 54 and soldered, brazed, or otherwise secured together.

In the preferred embodiment of the invention I have used Freon gas (F-11) on air conditioning blower installations, operating on a normal bonnet temperature of from 100 to 250 degrees Fahrenheit. This temperature range might be changed, depending upon the furnace design, and in such case one of the other refrigerants mentioned would be used. Sufficient refrigerant may be used in the bellows, so that at the top of a certain range of temperatures all of the refrigerant will be vaporized so that additional heat will not produce any further pressure tending to disrupt the bellows after the pulley has been actuated by the bellows.

In some embodiments of the invention the natural resiliency of the bellows 55 may be such as to assist the action of the fluid inside the bellows 55 and urge the plates 53, 54 apart.

The thermostatic container 46, which is formed by the end plates 53, 54 and bellows 55 is preferably filled with a limited amount of volatile liquid of suitable characteristics so that it is changed from liquid to gas at a suitable temperature to effect the expansion of the thermostatic element 46, and the amount of this liquid is limited so that when it has all changed to gas further expansion of the gas takes place only responsive to superheating of the gas. This gives the thermostat a proportional increase in pressure and expansive power while the liquid expansive element is being vaporized, which responsive action continues until all of the liquid is vaporized, whereupon the curve of pressure flattens out so that the further increase of pressure by superheating is substantially reduced over that which is accomplished while the gas is being vaporized.

Thus the thermostat may act between predetermined temperature limits by choosing a proper expansive element for filling the bellows 55. Suitable chemical compositions may be used, such as ethyl chloride, methyl chloride, alcohol, and ethyl ether.

The end wall 54 of the thermostatic element 46 may be provided with an axially extending filling tube 66, which has a longitudinally extending filling bore 67 that is closed by solder 68 at its end. This tube 66 is adapted to be received in an axial bore 69 in a stub shaft 52, which has one end reacting against the plate 54 and the other end reacting against the cross bar 37 of the removable pulley section 22.

A washer 51 may be interposed between the end of the shaft 52 and the plate 54 to increase the area of engagement. The bore 69 merely houses the tube 66, the end 68 of which does not engage the end of bore 69, but tube 66 serves to guide and support one end of thermostatic element 4 in the bore 69 of the shaft 52.

The shaft 52 is also supported for sliding movement in a counterbore 52a in the hub 34 so that the shaft 52 may follow the bar 37 as it moves into the slot 38, the shaft 52 extending into the bore 52a.

The range of movement of the movable pulley section 22 and its hub 27 on the hub 34 of the fixed section 21 is determined by the space between the base of the slot 38, which would be engaged by the bar 37 on movement toward the right and engagement by the end of the hub 27 with the end of the skirt 42.

This may be adjusted by threading the skirt 42 on the threaded portion 39 to the position desired, where it may be secured by any suitable means.

In the present embodiment the skirt 42 is threaded home on the threaded portion 39, and a washer 70 is mounted for sliding movement on the hub 34 between the end of the skirt 42 and the end of the hub 27. The size of this washer adjusts the maximum opening movement of the groove of the pulley by limiting the range of sliding movement of the hub 27 on the hub 34.

In order to subject the thermostatic element 46 constantly to the temperature of air passing over it wherever it may be located in an air duct or the like, the unit is preferably provided with a centrifugal fan, indicated in its entirety by the numeral 60.

This centrifugal fan comprises a pair of flat annular metal members 61, 61, which form the end walls of a rotor. The annular metal members 61, 61 have circular apertures 64, but the aperture 64 at the right of Fig. 2 is closed by a supporting plate 62 of circular shape, which has a central aperture of sufficient size to receive the hub 27.

The plate 62 is secured to the radially extending flange 31 by a plurality of screw bolts 71 passing through apertures in the plate 62 and threaded into bores in the flange 31. Thus the fan rotor 60 is concentrically located on the movable pulley section 27 to rotate with the pulley unit.

The annular members 61 of the rotor are secured together by a plurality of axially extending blades 63, these blades being located in slots in the annular members 61 and being spot welded in place, as shown in Fig. 6.

The blades 63 are preferably curved outwardly and backwardly away from the direction in which the rotor 60 rotates so that they tend to urge the air outwardly between the blades as the fan rotates. Thus the air comes in at the opening 64 at the left of the rotor and passes out between the blades 63 of the rotor.

The operation of the device is as follows: The resilient expanding action of the bellows 55 urges the pulley sections 21 and 22 toward each other in the following manner: The frame 41 is supported upon the fixed threaded end 39 of the fixed pulley section 21. The thermostat 46 reacts against the left end of the frame and urges the shaft toward the right.

The shaft 52 engages that portion of cross bar 37 which is located in counterbore 52a and urges the moveable pulley section 22 toward the right to the position of Fig. 3.

This movement is resisted by the action of the belt 26 and by the tightening action of the belt tightener, such as the motor being pivoted to bring its weight to bear upon the belt 26. Thus the belt 26 tends to wedge into the groove between the surfaces 24 and 32 and to spread the pulley sections 21, 22 to a position where the effective diameter of the pulley is reduced, as shown in Fig. 2.

When the thermostat 46 is subjected to a suitable temperature, its thermally expansible element begins to vaporize, to generate a pressure which reacts against the frame 41, supported by the fixed pulley section 21 and presses against the movable section 22 by means of the shaft 52 and the bar 37 to urge the pulley sections together toward the position of Fig. 3.

The movement of the pulley sections can be made substantially proportional to the increase in temperature over a predetermined range until substantially all of the expansible liquid element in the thermostat 46 has been vaporized.

Thus the effective diameter of the pulley 25 may be varied uniformly with temperature over a predetermined range and the speed of rotation of the blower driven by belt 26 may be made substantially proportional to the change of temperature.

The foregoing arrangement is effective to permit the use of a constantly operating motor and to effect the variable operation of a blower consequent upon variations of temperature in a return air duct in which the thermostat 46 is located.

The present device may be installed in the cold air return of a furnace, responsive to the temperature of air which is conducted to the thermostat 46 by a pipe from the top of the furnace bonnet so that increase of temperature causes an increase in the speed of drive of the blower; or the present device may be used in many other different ways to control the speed of drive of a blower or other driven member responsive to temperature.

The centrifugal fan 60 constantly draws air in at the aperture 64 and expels it between the blades of the rotor so that the air passes constantly over and around the thermostat 46 and the thermostat is constantly and quickly responsive to changes in temperature.

The present device is compact and simple and may be mounted as a unitary structure upon the shaft of a driving motor to be located within the return air duct leading to a warm air heating furnace.

The thermostatic element is concentrically located with respect to the shaft, and it rotates with the pulley and with the fan that draws air over the thermostatic element. Thus the present device is adapted to draw to it the air to which the thermostat is responsive, and it is adapted to react to small variations in temperature with a high degree of accuracy.

The thermally responsive member 46 is interconnected with the members of the pulley by being supported by a frame which is fixedly secured on the fixed pulley unit and by engaging a shaft which acts against a part carried by the movable pulley unit, so that the thermally responsive unit moves the pulley members axially with respect to each other to control the effective diameter of the pulley.

One of the most important advantages of the invention lies in its adaptability to various existing installations in that the attached fan is adapted to cause the device to draw to the thermostat, the sample of air required for its regulation. There are many installations where the motor is located outside the furnace or return air ducts where such a device can be used as the suction generated by the attached fan will pull its own sample of air over the thermostat.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a thermostatically controlled variable diameter pulley, the combination of a fixed pulley section provided with an elongated hub having a bore for receiving a shaft, said hub carrying a radially extending flange provided with a frusto-conical surface forming one side of a V groove with a movable pulley section comprising a cylindrical body formed with an enlarged bore for slidably receiving said hub, and with a radially extending flange having an opposing frusto-conical surface forming the other side of the V groove, said movable pulley section having a transversely extending actuating bar, and said fixed pulley section having a threaded extension provided with a slot for receiving said bar, a thermostat supporting frame of substantially rectangular shape having a central opening for receiving a bellows thermostat, said frame having a threaded bore at one end for threadedly receiving the extension of the fixed pulley section, the opposite end of said frame being provided with a threaded bore and an adjustable threaded member in said bore having a socket, a bellows thermostat having a projection at one end receivable in said socket, and having at its other end a cylindrical metal member receivable in the bore in said hub, said cylindrical metal member engaging said transverse bar to urge the pulley sections toward each other when the thermostat expands, the thermostat being spread by a V belt acting between the walls of said V-shaped groove, the radial flange of said movable pulley section supporting an annular plate, and a centrifugal impeller member comprising a pair of annular sheet metal members and joined together by a plurality of spaced axially extending curved vanes, said impeller being carried by said first-mentioned annular flange, and said impeller drawing air toward said thermostat and discharging the air at its periphery.

2. In a unitary thermostatically controlled variable diameter pulley, the combination of a pulley section having an elongated cylindrical hub provided with an axial bore, and means for securing a shaft in said bore, said hub carrying a frusto-conical flange forming one side of a pulley for a V belt, said hub having a diametrical slot extending into its end opposite from the flange and having a threaded end portion, with a second pulley section comprising a relatively shorter cylindrical hub having an axial bore for receiving the first-mentioned hub and having at one end a frusto-conical flange forming the opposite side of a pulley for a V belt, said movable pulley section having an integral diametrically extending bar at the end opposite to the flange, and said bar being slidably mounted in said slot to prevent relative rotation between the pulley sections, a thermostat frame comprising a substantially cylindrical body provided with a threaded bore and a counterbore with an annular shoulder between said bores, said threaded bore receiving the threaded end of said first-mentioned hub, said thermostat body supporting a pair of axially extending side frame members which carry a transversely extending end frame member, said end frame member having a threaded bore, a thermostat supporting member in said latter bore, and a bellows thermostat having an axially extending lug seated in said threaded member, said thermostat being provided at its opposite and filling end with an elongated filling tube, a combined push rod and housing for the filling tube comprising a cylindrical metal member slidably mounted in a counterbore in said first-mentioned hub and engaging with its end against said bar, said thermostat resisting alone the thrust on the movable pulley section caused by a V belt between said frusto-conical flanges, and an impeller comprising a circular disc provided with a central hole for receiving the second-mentioned hub, said circular disc being secured to the second-mentioned frusto-conical flange on the side opposite to the V groove, and a pair of annular sheet metal members joined together by curved vanes which pass through slots in said annular metal members and are bent over outside of said annular metal members, the vanes being curved outwardly and backwardly away from the direction in which the pulley rotates, one of said annular metal members being secured to said disc, thereby closing one end of the vane assembly, the vanes acting to impel the air radially outward as the pulley rotates, and to draw it inward past said thermostat at the end remote from the pulley, to subject the thermostat to the heat of the air moving axially over said thermostat, and thereafter radially out of said vanes, to regulate the spread of the pulley sections substantially proportional to the temperature of the air to which the thermostat is subjected.

WILLIAM W. HALLINAN.

REFERENCES CITED

The following references are of record in the file of this patent:

UNITED STATES PATENTS

| Number | Name | Date |
|---|---|---|
| 1,629,174 | Patton | May 17, 1927 |
| 1,662,289 | Whitehead | Mar. 13, 1928 |
| 2,210,976 | Hallinan | Aug. 13, 1940 |